United States Patent
Körner et al.

(10) Patent No.: US 7,258,043 B2
(45) Date of Patent: Aug. 21, 2007

(54) GEARBOX HOUSING AND GEARBOX MODULE

(75) Inventors: Tillmann Körner, Zang (DE); Martin Nitsche, Gerstetten (DE); Hans-Peter Eubler, Heidenheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 286 days.

(21) Appl. No.: 10/515,354

(22) PCT Filed: May 23, 2003

(86) PCT No.: PCT/EP03/05419

§ 371 (c)(1),
(2), (4) Date: Nov. 22, 2004

(87) PCT Pub. No.: WO03/100297

PCT Pub. Date: Dec. 4, 2003

(65) Prior Publication Data

US 2005/0178238 A1    Aug. 18, 2005

(30) Foreign Application Priority Data

May 25, 2002    (DE)    ................. 102 23 433

(51) Int. Cl.
*F16H 57/02*    (2006.01)
(52) U.S. Cl. .................................. 74/606 R
(58) Field of Classification Search .............. 74/526, 74/527, 596, 606 R; 361/685; 137/382; 312/276; 248/49, 68.1, 69, 73, 74.1–74.4; *F16M 1/00*
See application file for complete search history.

(56) References Cited

U.S. PATENT DOCUMENTS

| 1,722,581 | A |   | 7/1929  | Klaucke            |         |
|-----------|---|---|---------|--------------------|---------|
| 1,789,579 | A | * | 1/1931  | Agostino           | 74/596  |
| 2,537,363 | A | * | 1/1951  | Minor              | 312/276 |
| 2,668,680 | A | * | 2/1954  | Moser              | 137/382 |
| 4,616,525 | A |   | 10/1986 | Ueberschar         |         |
| 4,779,382 | A |   | 10/1988 | Rudolf et al.      | 51/168  |
| 5,584,207 | A |   | 12/1996 | Paul et al.        | 74/89.22|
| 5,963,526 | A |   | 10/1999 | Lee                | 369/72  |
| 7,110,250 | B2| * | 9/2006  | Lee                | 361/685 |

FOREIGN PATENT DOCUMENTS

| DE | 1 165 451    |   | 3/1964  |
|----|--------------|---|---------|
| DE | GM 79 22 673 | * | 11/1979 |
| DE | 36 23 555    |   | 2/1988  |
| DE | 43 05 133    |   | 4/1995  |

(Continued)

*Primary Examiner*—Vinh T. Luong
(74) *Attorney, Agent, or Firm*—Baker & Daniels LLP

(57) ABSTRACT

A gearbox housing with at least one first upper housing piece and a second lower housing piece, which may be detachably connected to each other. The gearbox housing has upper and lower housing pieces that are partially detachably connected to each other, with at least one rotating jointed connection between the upper housing piece and the lower housing piece, which are each arranged on a side described by the housing pieces in a view of the connection plane described by the profile and permitting a theoretical pivoting axis for pivoting the housing pieces relative to each other while maintaining the connection between the components. A catch is provided on the sides free of the rotating jointed connection.

18 Claims, 5 Drawing Sheets

FOREIGN PATENT DOCUMENTS

| | | | |
|---|---|---|---|
| DE | 295 00 907 | * | 4/1995 |
| DE | 199 50 967 | | 5/2001 |
| DE | 698 01 921 | | 6/2002 |
| DE | 198 57 698 | | 10/2002 |
| EP | 0 149 808 | | 7/1985 |
| EP | 0 562 544 A1 | * | 3/1993 |
| EP | 1 015 735 | | 8/1998 |
| GB | 931.171 | | 7/1963 |
| JP | 2004-275049 | * | 10/2004 |
| WO | WO 01/29454 | | 4/2001 |

* cited by examiner

GEARBOX HOUSING AND GEARBOX MODULE

BACKGROUND OF THE INVENTION

The present invention relates to a transmission housing and additionally a transmission modular unit.

Transmission housings are known in various embodiments. Reference is made to DE 199 50 967 A1 as a representative, for example. This application discloses a control platform for a transmission modular unit which is positioned in the region of an operating means and/or oil sump in the housing of the transmission modular unit, the oil sump being enclosed by an oil pan. In this case, this region forms a lower transmission housing part which is connected to an upper transmission housing part to form a modular unit—the transmission housing. The attachment occurs via a fasteners, in the form of screws, for example. Since transmission modular units of this type are dimensioned differently for different uses, the problem of simple installation and uninstallation and/or easy accessibility to the inside of the transmission for service repair and replacement work arises, particularly for heavy transmissions. The exact threading of sensors represents a further problem during installation. An additional auxiliary device, typically a lift truck, is necessary for installation and uninstallation for reasons of occupational safety, in particular for service and repair and replacement actions, the separation and/or opening of the housing also not able to be performed without something further. For especially heavy embodiments of the transmission housing, it is also difficult to position the lower housing part exactly and attach it. If the transmission housing is suspended, the lower housing part must be attached from below, exact positioning only being possible with difficulty because of the weight of the lower housing part, i.e., this is only able to be performed with additional auxiliary means. Furthermore, removing the lower housing part also represents a specific set of problems, in particular, a safety device which supports the lower housing part and thus unloads the service personnel is also necessary here.

SUMMARY OF THE INVENTION

The present invention is thus based on the object of refining a transmission housing in such a way that the cited disadvantages are avoided, in particular even for transmission modular units for transmitting higher powers, which have a corresponding weight because of the required dimensioning, permitting easy installation of the transmission housing, and furthermore also allowing easy accessibility to the power-transmitting elements. In addition, the transmission housing is to be distinguished by easy handling and service friendliness when used to enclose power-transmitting elements, i.e., repair and replacement actions are to be able to be performed without problems and manage without additional auxiliary means.

The transmission housing comprises at least one upper housing part and one second lower housing part, at least partially enclosing an operating means sump, which are detachably connected to one another. The upper housing part is used to receive and mount the torque-transmitting components. The housing is divided in the vertical direction. According to the present invention, the lower housing part, which accommodates the operating means, particularly the oil sump, and the upper housing part are only partially detachably connected to one another, in that they are coupled to one another on one side via a pivot-point connection which allows pivoting of one housing part in relation to the other housing part around a theoretical pivot axis which lies in a connection plane between the housing parts, and which is describable through the positioning of the means for detachable connection, particularly the fasteners, the connection between the upper and lower housing parts in the region of the theoretical pivot axis remaining in effect during the pivoting. The pivoting occurs at least essentially in the vertical direction. For this purpose, at least one pivot point is provided between the upper and lower housing parts in the region of the theoretical pivot axis, via which the connection and the pivot action around its axis of rotation occur. In this case, at least one safety mechanism is provided between the upper and lower housing parts at the side free of the articulated connection in the connection region. The safety mechanism is used, when the detachable connection between the upper and lower housing parts is unfastened, to limit the pivot angle a between the upper and lower housing parts to a limiting angle $\beta$. The safety mechanism must be activated manually in this case in order to achieve a pivot around an angle greater than the limiting angle $\beta$ until the maximum pivot angle is achieved. In this case, the maximum pivot angle $\alpha_{max}$ corresponds to the pivot angle of the lower housing part in relation to the upper housing part made possible by the pivot point and the positioning of the transmission housing. When the transmission housing is positioned in a suspended position, the maximum pivot angle is additionally delimited by the suspension position of the transmission housing and by the position freely resulting because of the weight of the housing lower part, so that a pivot angle from >0 up through at least 90° is achieved without additional auxiliary means. The pivot point is implemented in such a way that the pivot axis formed thereby extends over at least a part of one of the sides which describe the contour of the housing lower part and/or housing upper part in the connection region in a top view. The connection between the upper housing part and the lower housing part is preferably implemented as a hinge connection in this case, i.e., a connection which allows pivoting of one component in relation to the other around a theoretical axis lying in the connection plane which is describable by the connection, while maintaining the coupling between the upper housing part and the lower housing part.

The connection plane identifies the plane, observed in the vertical direction, aligned in the horizontal direction or at an angle thereto, which is characterized by the contiguity of the faces of the upper and lower housing parts facing toward one another. The connection region between the two housing parts may be characterized by a) one connection plane or b) multiple individual connection planes in a row.

There are no restrictions in regard to the concrete design of the hinge connection. In this regard, all possible technical designs may be used, the hinge typically always being formed by a separate element which is connected to the two housing parts, however.

There are multiple possibilities in regard to the design of the safety mechanism. However, care must be taken in the dimensioning in this case that the safety mechanism must be suitable for holding the lower housing part in its position in relation to the upper housing part while pivoting around the limiting angle $\beta$. The safety mechanism itself is typically designed as a positive connection, preferably in the form of a catch or latch connection. This type of connection includes a first element which is connected to the upper housing part and a second element which is connected to the lower housing part, one of the two elements including a recess, while the other has a projection which engages therein. In the normal installation state, i.e., with a connection between the upper and lower housing parts to form the closed transmission housing, the safety mechanism is unloaded. The element having a projection is guided into the recess with pre-tension in this case, preferably without exerting force on the element carrying the recess. The safety mechanism first comes to bear and/or the positive connection between the first and second element is first implemented when the lower housing part is pivoted in relation to the upper housing part. The mechanism is designed in this case so that the positive connection is implemented upon reaching the limiting angle β. In the simplest case, the element connected to the upper housing part is designed as a pawl, which is attached to the upper housing part so it is pivotable and which engages in a recess on a catch element connected to the lower housing part. In this case, the pawl is fixed in its position by the stop formed by the recess and, furthermore, by an elastic element under pre-tension. The elastic element is preferably designed as a spring unit. Only when the pre-tension is removed is the positive connection between the pawl and recess achieved. A reversal of the assignment of catch element in catch to the housing parts is also conceivable. The positive connection is then unfastened when additional force is exerted on the pawl. The positive connection is designed so that a force exerted by an installer by hand is sufficient, this force not being able to be dimensioned too small for reasons of occupational safety.

According to an especially advantageous embodiment, the lower transmission housing part is implemented in such a way that it already contains the electronic and preferably also the hydraulic control devices. In this case, an electronic control device is understood as the totality of electronic control units, i.e., controllers, sensors, and connections to the final control element. Electronic control unit is understood as the controller and/or a unit made of electrical and electronic components to which the variables necessary for activating the transmission modular unit are supplied and which are processed therein, and which outputs the manipulated variables produced from the input variables in accordance with the desired activation procedure. For this purpose, the control unit typically includes multiple electrical and electronic components which are assigned and coupled to one another in accordance with the processing of the input variables to be performed. Preferably, multiple components of this type are positioned together on at least one support plate and are enclosed by a control unit housing. The possibility arises in this case that the support plate is completely integrated into the control unit housing or at least forms a partial wall region of the control unit housing.

In a further aspect of the present invention, the entire electronic control device is integrated into the transmission housing and is positioned in direct spatial proximity to the hydraulic control device. This means that multiple, preferably all devices for detecting a variable which at least indirectly characterizes the driving state and/or the function of the transmission modular unit are also integrated into the transmission modular unit and are positioned in spatial proximity to the hydraulic control device.

In this case, a hydraulic control device is understood as the hydraulic connections between the detection means of an input variable and/or the electrical control device and the final control elements, which typically have a pressure applied to them hydraulically, and the elements functioning as actuators and their coupling to the control elements. Essentially all elements which it is necessary to actuate for actuating and/or setting the individual gears are included in this case.

Preferably, each of the control devices and/or units—electronic control unit and hydraulic control device—is assigned a corresponding support element, which are connectable to one another to form a support device, so that a modular unit including at least the electronic control unit and the hydraulic control device may be formed. This may then be removed easily as a whole from the transmission modular unit. A further possibility is to position both—the electronic control device and the hydraulic control device—on a central support element and also form one modular unit. In both cases, the entire modular unit made of support element(s), hydraulic control device, and electronic control unit is identified as a control platform which may be offered as a commercial modular unit. This may preferably be mounted in the housing lower part.

In a further aspect, a cooling device is assigned to the operating means and/or control means and/or lubricant loop of the transmission modular unit and integrated into the housing. This may be designed in different ways, but typically includes either at least one cooler or a heat exchanger. The cooling device is preferably positioned next to one of the two devices—electronic control device and/or electronic control unit or hydraulic control device—and/or between the two. Optimum cooling of the electronic modular unit may thus be additionally achieved.

Preferably, the cooling device, electronic control device, and hydraulic control device are positioned on a shared carrier element or are each positioned on their own carrier elements which may be assembled with one another to form a modular unit and thus produce a control platform. Preferably, a majority of the detection devices, typically implemented as sensors, for determining the input variables of the transmission modular unit to be processed in the control device or unit, are also positioned on the control platform and/or integrated therein, in order to thus provide an even more compact modular unit which is easily replaceable. In this case, the control device would also be positioned almost completely on the support element. The support element is then integrated into the transmission lower housing part.

In a further aspect of the present invention, the electronic control device is assigned a housing which is preferably implemented as sealed to a hydraulic fluid, such as oil, and/or another liquid. The control unit may then also be positioned in the oil sump of the transmission modular unit. The possibility thus arises of subjecting the electrical and electronic components of the control unit to at least indirect cooling through the operating means located in the operating means and/or oil sump of the transmission modular unit. The oil-tight design of the housing, however, requires an appropriately designed bushing on the housing to implement the electrical connection between the control unit and the sensors of the control device necessary for detecting the variables, which at least indirectly characterize the current driving state and/or the driver command and/or further boundary conditions, and the actuators to be activated using the control device for actuating the individual elements of the transmission modular unit, for example, for implementing the gear change and/or presetting input variables through a higher-order control and/or regulating device. Preferably, the individual contact elements or lines are guided through the control unit housing embedded in an electrically nonconductive and liquid-tight material, so that penetration of harmful materials, such as oil, is prevented.

BRIEF DESCRIPTION OF THE DRAWINGS

The achievement of the object according to the present invention will be explained in the following on the basis of figures. The following is shown therein in detail.

DETAILED DESCRIPTION

Figure 1:
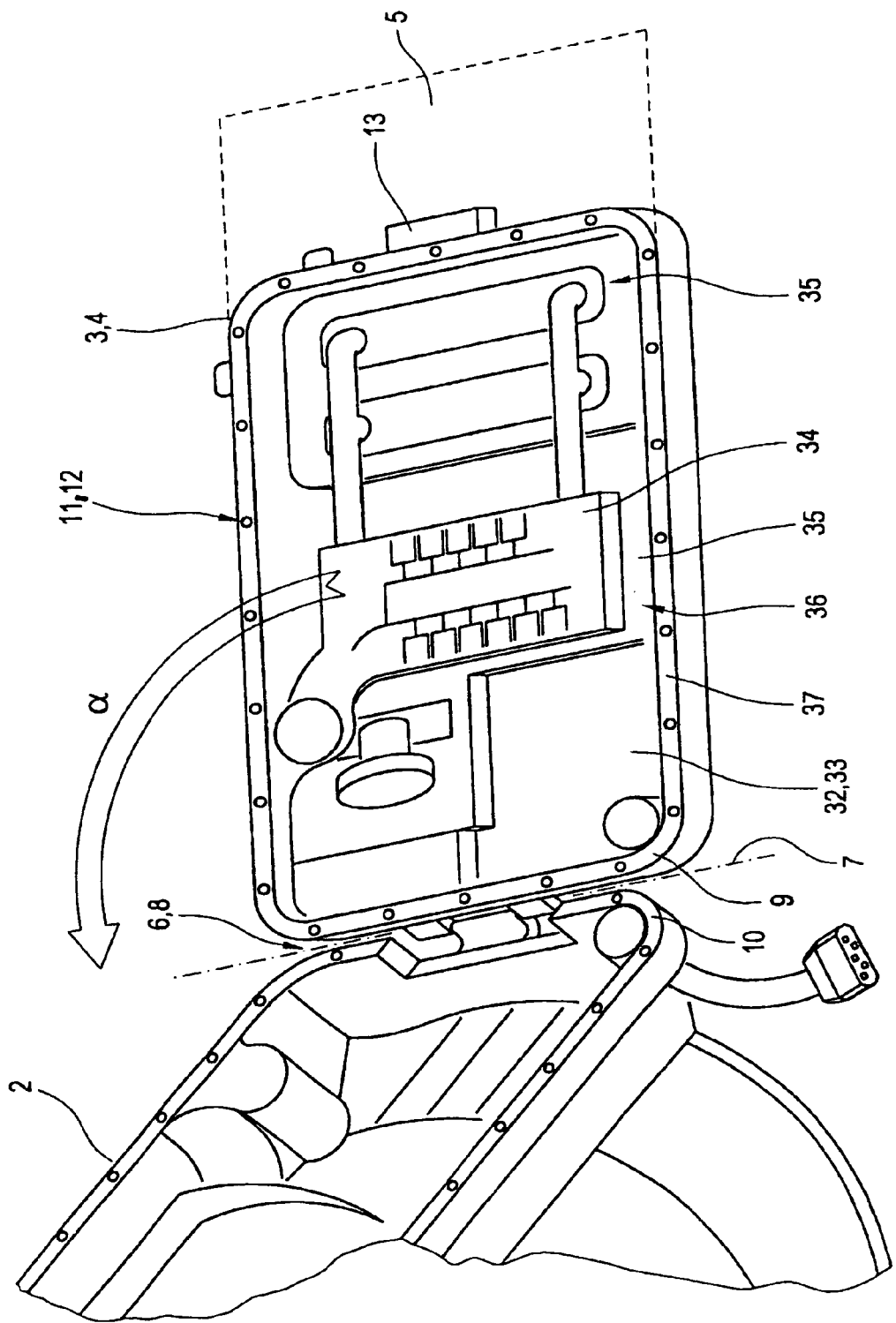
FIG. 1 illustrates, on the basis of a perspective view, the possibility of a design of a transmission housing according to the present invention.

FIG. 1 shows a schematic, simplified illustration of the basic construction of a transmission housing 1 according to the present invention in the open state on the basis of a perspective illustration. Viewed in the vertical direction, this housing is implemented in at least two parts and includes a first upper housing part 2 and a second lower housing part 3, which at least partially accommodates an operating means sump. The second lower housing part 3 is therefore also referred to as the oil sump 4. The first upper housing part 2 and the second lower housing part 3 are detachably connected to one another. According to the present invention, however, in the region of a connection plane 5 provided in the vertical direction, the second lower housing part 3 is coupled to the first upper housing part 2 via a pivot-point connection 6, which allows pivoting of the oil sump 4 in relation to the first upper housing part 2 around a theoretical axis 7 which lies in this connection plane 5 and describes a part of the connection between the first upper housing part 2 and the oil sump 4, while maintaining a connection between the upper and lower housing parts. This also analogously applies for pivoting the upper housing part 2 in relation to the lower housing part 3. The pivot-point connection 6 is preferably implemented as a hinge connection 8 in this case. This is positioned on at least one side 9 of the contour described by the lower housing part 3 and the side 10 of the contour described by the upper housing part 2 in the connection plane 5 seen in the view from above. The overall separation region which is describable by the separation and/or division into the upper and lower housing parts 3 and 2 may be described by a connection plane 5 or by a positive assembly of multiple individual connection planes 5.1 through 5.n.

In the embodiment shown in FIG. 1, only one connection plane 5 is provided in the vertical direction, which is aligned horizontally in the installation position. The faces of the upper and lower housing parts 3 and 2 adjoining one another therein describe a geometric shape and/or contour which is determined by multiple sides in a top view. The pivot-point connection 6 is positioned on only one side in this case, the side 9 or 10 here. The hinge connection may be positioned on any arbitrary diametrically opposing sides of the upper and lower housing parts 3 and 2 in this case. The connection to the remaining sides is performed via means for detachable connection 11, which are to be positioned and laid out on the transmission modular unit in accordance with the dimensioning of the transmission housing 1. These typically include fasteners 12 which fix the position of the upper housing part 2 and the lower housing part 3 in both the axial and vertical directions.

The remaining sides free of the pivot-point connection 6 are understood as the sides of a contour which describes the geometry in a top view resulting in a section in or parallel to the connection plane 5.

The pivot-point connection 6 preferably extends over a majority of the extension of the diametrically opposing sides 9 and 10 of the upper and lower housing parts 3 and 2 in a top view thereof in the connection plane 5.

Figure 4B:
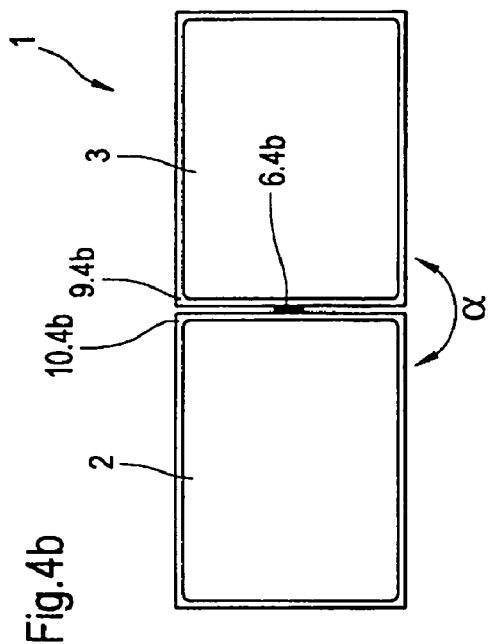
FIGS. 4a-4c illustrate possible arrangements of the pivot point connections.
Figure 4C:
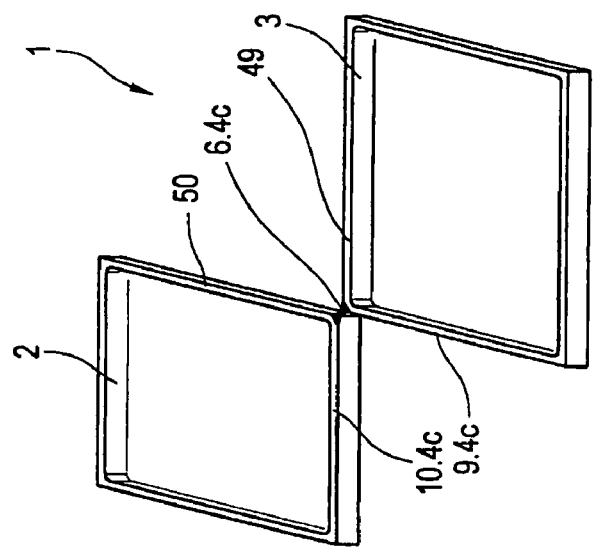
Figure 4A:
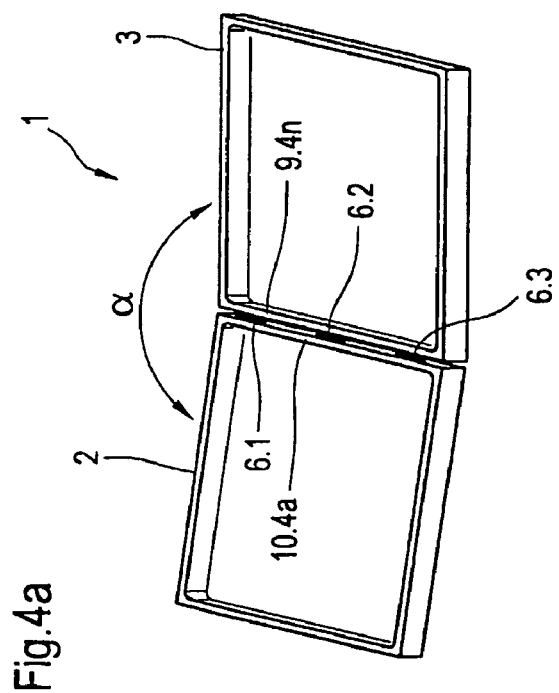

However, positioning multiple individual pivot-point individual connections 6.1 through 6.n over the extension of the diametrically opposing sides 9 and 10 at a specific distance a to one another, as shown in FIG. 4a, or, for smaller transmission modular units, a single pivot-point connection 6.4b in the central region of the extension of the diametrically opposing sides 9.4b and 10.4b, as shown in FIG. 4b, are also conceivable. A further theoretical arrangement of the pivot-point connection 6.4c is to position it in the boundary region between two sides 9.4c and 10.4c or 10 and 50, which adjoin one another at an angle, of the two housing parts 2.4 and 3.4, as shown in FIG. 4c.

In order to avoid undesired rapid pivoting of the second lower housing part 3 in relation to the first upper housing part 2 upon detaching the fasteners 12 when the housing 1 is suspended, at least one safety mechanism 13 is provided which allows partial pivoting of the lower housing part 3 in relation to the upper housing part 2 after the fasteners 12 are detached, but limits the pivot angle $\alpha$ to a limiting angle $\beta$ by implementing a positive connection 14. This safety mechanism 13 may be designed in different ways. The safety mechanism 13 may only be detached through further manual actuation, pivoting between the upper housing part 2 and the lower housing part 3 up to the maximum pivot angle then being possible.

Figure 2A:
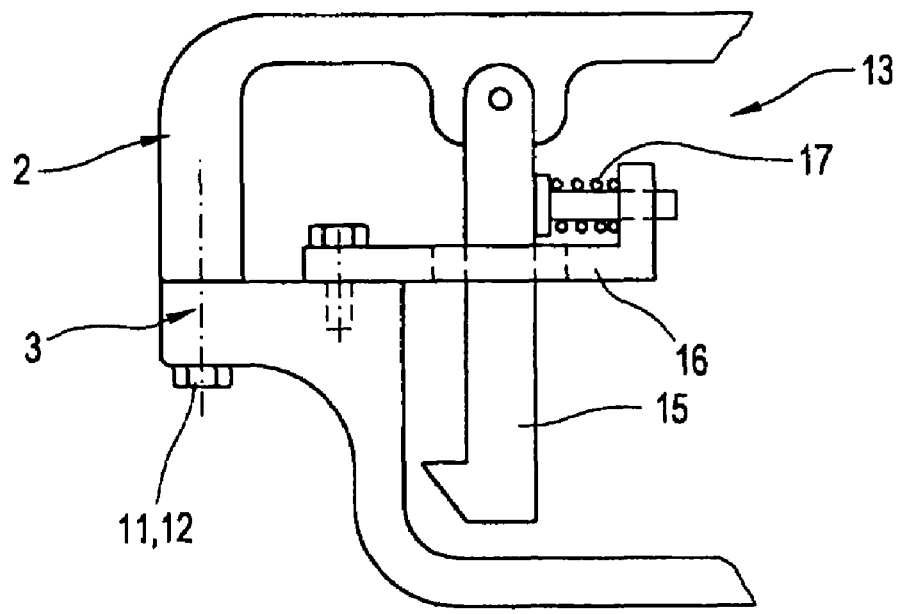
FIGS. 2a-2c illustrate, on the basis of three views, a possible embodiment of a safety mechanism.

The safety mechanism 13 is shown in FIG. 2a on the basis of a detail from a sectional illustration through a transmission housing 1 and is designed in the simplest case in such a way that it includes at least one catch element 15 which is coupled fixed to one of the two transmission components, in the case shown the upper housing part 2. This catch element 15 is preferably mounted on the upper housing part 2 so it is pivotable. The catch element 15 also positively engages in a catch 16, which is positioned on and/or permanently connected to second housing part, in this case the lower housing part 3, the catch element 15 merely engaging in the catch 16, i.e., being freely guided thereby without receiving force, in the closed state between the first upper housing part 2 and the second lower housing part 3. When the fasteners 12 are detached and the second lower housing part 3 is pivoted in relation to the first upper housing part 2 around a small pivot angle $\alpha_1$, which corresponds to the limiting angle $\beta$, the catch element 15 engages in the catch 16 and thus forms a positive connection. The catch element 15 is held in its position in the axial direction by a spring unit 17 for this purpose. The safety mechanism 13 may only be opened manually by pivoting the catch element 15 in relation to the spring unit 17 and thus against a pre-tension force. A corresponding embodiment for a safety mechanism 13 of this type is shown in FIGS. 2a and 2b in the example of an embodiment as a pawl 18. The catch element 15 is implemented as the pawl 18 in this case. This has a part, carrying a barb 19, which is aligned toward the second lower housing part 3 and/or is implemented on the end of the pawl 18 pointing toward it in the installed position. The pawl 18 is mounted on the upper housing part 2 so it is pivotable, via a pivot bearing 20 in the case shown. The catch 16 is formed by a sheet-metal element 21, for example, which is detachably coupled to the lower housing part 3 via fasteners 22, the attachment preferably being in the region of the connection plane 5. For this purpose, the wall 23 of the second lower housing part 3 is designed like a flange in the region of the connection plane 5, this flange 24 also forming a further contact surface 26 for the sheet-metal element 21 in addition to the connection surface 25 and/or contact surface for the upper housing part 2. The sheet-metal element 21 has at least one recess 27 complementary to the pawl 18, through which the pawl 18 may be guided. The pawl 18 is fixed in its position in the recess 27 in relation to the pivot bearing 20 by the spring unit 17, the recess 27 simultaneously forming a stop 28 in the horizontal and vertical directions for the pawl 18. In this case, the recess 27 has a cross-section which at least corresponds to the cross-section of the pawl 18 in the region of the barb 19. The barb 19 is directed in the axial direction toward the stop 28 in this case, so that the face 29 facing toward the sheet-metal element 21 comes to rest on the face 30 of the sheet-metal element 21 facing away from the upper housing part 2 when the lower housing part 3 is moved and/or pivoted in relation to the upper housing part 2 or vice versa. Only through separate application of force, i.e., manually by the service and maintenance personnel, for example, to the pawl 18 and possibly also against the pre-tension force of the spring unit 17, is the safety mechanism 13 detached by guiding the pawl 18 through the recess 27. FIG. 2b illustrates a view in the engaged, i.e., pivoted state around the limiting angle β.

Figure 2C:
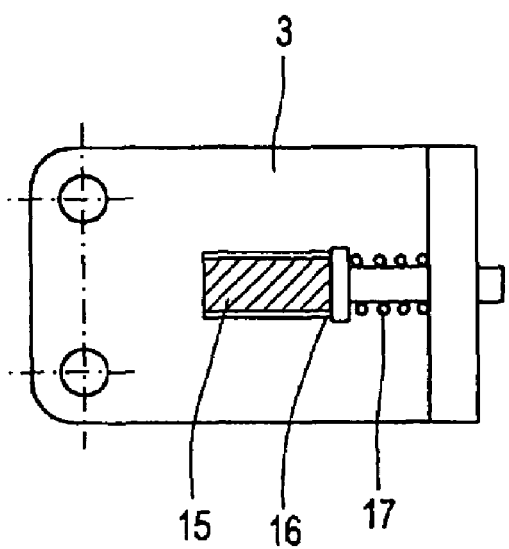
Figure 2B:
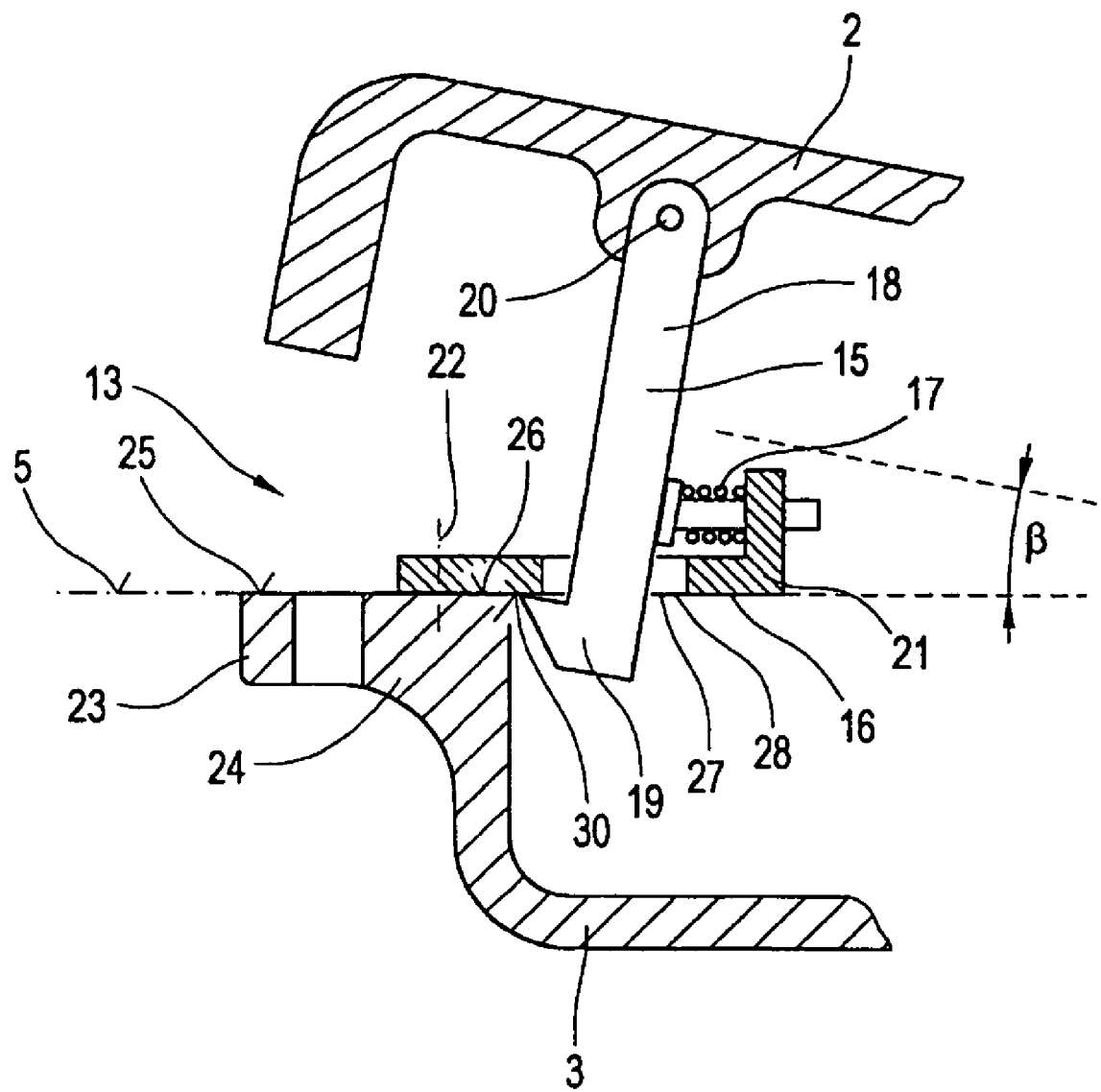

FIG. 2c illustrates a view from above of the safety mechanism 13 in the section on the lower housing part 3.

The achievement of the object according to the present invention offers the advantage that, independently of the concrete design of the lower housing part 3, particularly the oil pan 4, when used in a transmission modular unit 31, for a desired diagnosis or a necessary rapid replacement of individual components, the entire transmission, i.e., the transmission modular unit 31, must only be suspended for heavy transmissions, the first upper housing part 2 being suspended and the second lower housing part 3 simply being folded down. In accordance with the design of the pivot-point connection 6 between the upper and lower housing parts 2 and 3, no further support is necessary for the lower housing part 3 after it is folded down and it may remain in the pivoted state. The installer may thus reach the elements mounted in the transmission housing 1 rapidly and very easily. A lift truck for the transmission modular unit 31 is not necessary. Furthermore, complex threading is dispensed with when installation is desired, i.e., closing the housing 1, since the position of the housing parts 2 and 3 is fixed in relation to one another through the fixed coupling existing via the articulated connection 6. The hinge connection 8 is positioned and designed in this case so that it extends over a significant part of the corresponding sides 9 and 10, respectively, in order to achieve additional fixing of the position between the upper and lower housing parts 2 and 3 in the horizontal direction.

Figure 3A:
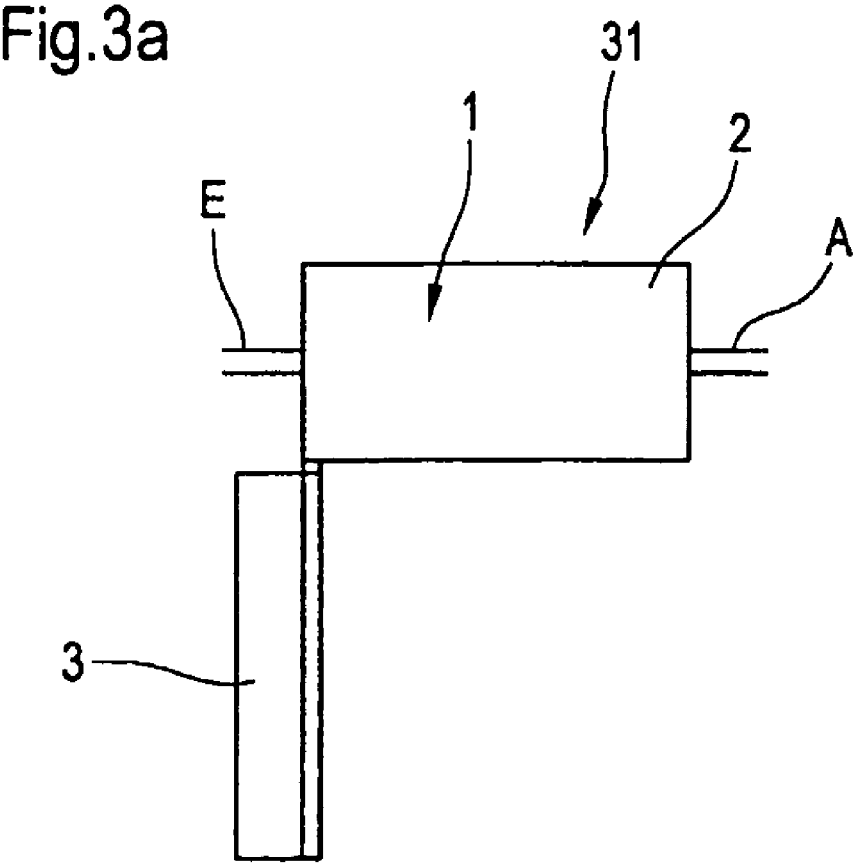
FIGS. 3a and 3b illustrate, in a schematic, greatly simplified view, a transmission modular unit having a transmission housing according to the present invention.
Figure 3B:
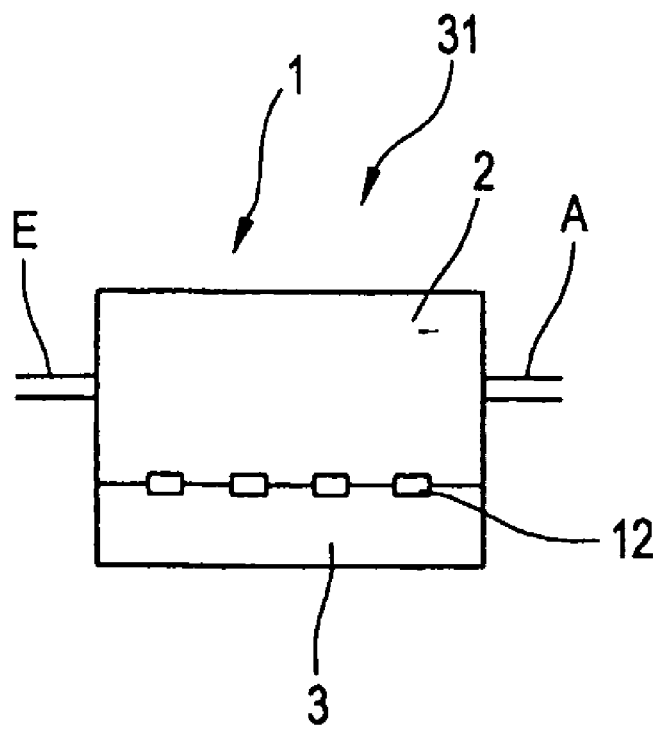

FIG. 3a shows a schematic and greatly simplified illustration of a transmission modular unit 31 having a transmission housing 1 designed according to the present invention in the unfastened state, while FIG. 3b shows the transmission modular unit 31 in the installed state. Only the input E and the output A, as well as the transmission housing 1 made of first upper housing part 2 and second lower housing part 3 and fasteners 12, are shown.

The statements made in FIGS. 1 through 3 do not apply only to transmission housings 1 which only include a first upper housing part 2 and a second lower housing part 3. Embodiments in which a housing cover is also provided in the axial direction are also conceivable.

According to an especially advantageous embodiment, additionally shown as an example in FIG. 1, the lower housing part 3 includes an electronic control device 32 having a control unit 33 and a hydraulic control device 34, as shown in FIG. 5. Furthermore, according to an especially advantageous embodiment, a cooling device 35 is additionally provided. There are multiple possibilities in this case in regard to the concrete design of the electronic control device 32 and the hydraulic control device 34. In the simplest case, the electronic control device 32 includes at least one electronic control unit 33, which has at least one input and one output. The input or inputs are coupled in this case to devices for at least indirect detection of at least one variable which characterizes the mode of operation of the transmission modular unit. These devices are preferably implemented in the form of sensors. The output or outputs are coupled to corresponding final control elements. These may be a component of the hydraulic control device or may be coupled to the outputs of the hydraulic control device. For this purpose, the hydraulic control device 34 includes at least one, preferably multiple hydraulic control unit, which also have inputs and outputs. The hydraulic control unit 34 may be implemented in this case in the form of electromagnetically actuatable valve devices. These are used to activate elements which are also referred to as actuators. These are in turn used to actuate individual clutch and/or brake devices of the transmission modular unit 31 to be actuated to implement a gear change, for example. Preferably, all elements of the electronic control device 32 and the hydraulic control device 34 are positioned on a support element 35, which is a component of the lower housing part 3 and/or is formed by this part. It is thus possible to achieve the complete wiring of all actuators and sensors using the electronic control unit 33, due to which no consideration must be taken of any possible existing wiring between the upper housing part 2 and the lower housing part 3 when the lower housing part 3 is detached and/or pivoted in relation to the upper housing part 2. The support element 35, the electronic control device 32, and the hydraulic control device 34 form a control platform 36 in this case. This may additionally include further functional elements, such as operating-means conveyance devices, filter devices, etc. The electronic control unit 32 is typically positioned so it is shielded once again from the inner chamber 37 of the lower housing part 3, particularly, if this part is used as an oil pan 4, in order to achieve appropriate encapsulation. A further possibility is to provide the second lower housing part 3 with a bulge provided in the inside 47 in the direction of the upper housing part and to flange mount the electronic control device 32 on the lower housing part 3 more or less from the outside, the coupling to the other elements being implemented through the housing wall. There are multiple possibilities for possible individual concrete arrangements of the electronic control device 32, the hydraulic control device 34, and the individual sensors and actuators, as well as the functional elements. Reference is made in this regard to the publication DE 199 50 967 A1. The content of the disclosure of this publication in regard to the possible arrangements of individual elements of a control platform 36 is hereby included in its entirety in the content of the disclosure of this application.

What is claimed is:

1. A transmission unit having an input, an output and a housing, said housing comprising:
- at least one upper housing part and at least one lower housing part pivotably connected to one another;
- at least one of the upper and lower housing parts receiving and mounting power transmitting parts, said lower housing part including an oil sump;
- a pivot connection between the upper housing part and the lower housing part, the pivot connection being on a side of the housing in a connection plane and defining a pivot axis in said plane whereby the housing parts pivot relative to each other and remain connected;
- attachment elements on sides of the housing parts free from the pivot connection detachably fastening said housing parts together in a closed position; and
- a safety mechanism limiting the pivot angle of the housing parts about said axis to a limiting angle (β), said safety mechanism including at least one catch element pivotably mounted on one of the housing parts and a catch mounted on the other housing part;
- wherein the catch element is urged under a pretension force into alignment with the catch when the housing elements are in the closed position and engages the catch when the attachment elements release the housing parts and permit the housing parts to rotate to an open position to the limiting angle (β) to retain the housing parts at the limiting angle (β);
- said catch element selectively movable under force against the pretension force to disengage the catch and permit the housing parts to more fully open.

2. The transmission unit according to claim 1, wherein the pivot connection extends substantially over the entire extension of the side of the housing to which the pivot connection is connected.

3. The transmission unit according to claim 2, wherein the catch is positioned on the lower housing part and the catch element is positioned on the upper housing part.

4. The transmission unit according to claim 2, wherein the catch element is a pawl having a barb.

5. The transmission unit according to claim 1, wherein the pivot connection is positioned in a middle region of the extension of the side of the housing to which the pivot connection is connected.

6. The transmission unit according to claim 5, wherein the catch is positioned on the lower housing part and the catch element is positioned on the upper housing part.

7. The transmission unit according to claim 5, wherein the catch element is a pawl having a barb.

8. The transmission unit according to claim 1, wherein the pivot connection conprises multiple individual pivot connections which are connected to a side of the housing and spaced apart relative to one another over the extension of the side of the housing to which the pivot connections are connected.

9. The transmission unit according to claim 8, wherein the catch is positioned on the lower housing part and the catch element is positioned on the upper housing part.

10. The transmission unit according to claim 8, wherein the catch element is a pawl having a barb.

11. The transmission unit according to claim 1, wherein the pivot connection is positioned in the region of the intersection of two sides of the housing.

12. The transmission unit according to claim 11, wherein the catch is positioned on the lower housing part and the catch element is positioned on the upper housing part.

13. The transmission unit according to claim 11, wherein the catch element is a pawl having a barb.

14. The transmission unit according to claim 1, wherein the catch is positioned on the lower housing part and the catch element is positioned on the upper housing part.

15. The transmission unit according to claim 14, wherein the catch element is a pawl having a barb.

16. The transmission unit according to claim 1, wherein the catch element is a pawl having a barb.

17. The transmission unit according to claim 1, including an electronic control unit and a hydraulic control unit combined into a control platform which is mounted in the housing lower part.

18. The transmission unit according to claim 1, wherein the power-transmitting parts are mounted in the upper housing part.

* * * * *

UNITED STATES PATENT AND TRADEMARK OFFICE
CERTIFICATE OF CORRECTION

PATENT NO. : 7,258,043 B2  Page 1 of 1
APPLICATION NO. : 10/515354
DATED : August 21, 2007
INVENTOR(S) : Tillmann Korner et al.

It is certified that error appears in the above-identified patent and that said Letters Patent is hereby corrected as shown below:

Claim 8, Column 10, Line 7, delete "conprises" and insert --comprises--

Signed and Sealed this

Eleventh Day of December, 2007

JON W. DUDAS
*Director of the United States Patent and Trademark Office*